United States Patent [19]

Ricouard et al.

[11] 4,204,158
[45] May 20, 1980

[54] HALL EFFECT POSITION DETECTOR USING A SINGLE PERMANENT MAGNET

[75] Inventors: Jean-Pierre Ricouard, Suresnes; Bruno Schorter, Morsang, Orge, both of France

[73] Assignee: U.S. Philips Corporation, New York, N.Y.

[21] Appl. No.: 891,714

[22] Filed: Mar. 30, 1978

[30] Foreign Application Priority Data

Apr. 20, 1977 [FR] France .................. 77 11875

[51] Int. Cl.$^2$ .................................. G01R 33/12
[52] U.S. Cl. .............................. 324/208; 310/168; 310/DIG. 3; 338/32 H
[58] Field of Search ............ 324/207, 208, 251, 252; 310/683, 111, 168, DIG. 3; 323/94 H; 338/32 R, 32 H

[56] References Cited

U.S. PATENT DOCUMENTS

| 3,226,657 | 12/1965 | Wiehl et al. | 324/251 |
| 4,086,533 | 4/1978 | Ricouard et al. | 324/208 |

FOREIGN PATENT DOCUMENTS

| 2238525 | 2/1974 | Fed. Rep. of Germany | 324/174 |
| 949593 | of 0000 | United Kingdom | 324/208 |

*Primary Examiner*—Rudolph V. Rolinec
*Assistant Examiner*—Walter E. Snow
*Attorney, Agent, or Firm*—Thomas A. Briody; William J. Streeter; Bernard Franzblau

[57] ABSTRACT

A device for detecting specific positions of a moving part, for example a rapidly rotating part provided with soft-magnetic projecting elements which alternately pass close to the detector device, which comprises a stationary magnetic exciter circuit for a Hall-effect crystal.

The magnetic exciter circuit comprises a single permanent magnet having one pole face oriented towards the moving part, and provided with two symmetrical soft-magnetic pole pieces forming a narrow gap in which the Hall-effect crystal is disposed.

10 Claims, 7 Drawing Figures

HALL EFFECT POSITION DETECTOR USING A SINGLE PERMANENT MAGNET

The present invention relates to a Hall effect position detector comprising a stationary magnetic exciter circuit for the Hall-effect crystal which cooperates with a movable part which moves in the immediate proximity of said detector and which comprises soft-magnetic elements which during their movement are respectively and alternately situated on either side of the axis of symmetry of the position detector. The trailing end of one soft-magnetic element situated on one side of said axis substantially coinciding with the leading end of a soft-magnetic element situated on the other side of said axis of symmetry.

From an article entitled: "Kontaktloser Signalgeber mit BerULM/u/ hrungsloser Betätigung durch Eisenteile" (Contactless detector which responds to the proximity of iron parts), published in the German magazine ELEKTROTECHNISCHE ZEITSCHRIFT—A, volume 83, No. 11 of May 21, 1962, pages 367 to 372, an example of a position detector device is known which employs a Hall-effect crystal and a magnetic exciter circuit which comprises two permanent magnets disposed in parallel, in which the displacement of an iron part relative to the two magnets in a direction which corresponds to the axis of alignment of the front pole faces of said magnets causes an inversion of the transverse component of the magnetic field at certain instants, which component is the effective component relative to the Hall-effect crystal.

The detector described in said article was intended to sense the transverse displacement along a horizontal conveyer of great length of each of the girders supporting an automobile body without stringent requirements in respect of precision.

The precision of position detection by means of devices employed in this type of detector cannot be very high and these devices, which have been designed for a longitudinal translational movement, cannot be used for high-precision detection of angular positions measured on a rapidly rotating part such as the crankshaft of an internal combustion engine.

A different method has been devised for obtaining the inversion of the effective component of the magnetic field which influences a Hall-effect device, which method is in particular intended for the precise detection of the position of rotating parts. This method is revealed in the U.S. Pat. No. 4,086,533 which was issued Apr. 25, 1978.

In accordance with the method described in said U.S. patent, an auxiliary part is rigidly connected to the moving part whose passage through specific well-defined positions is to be detected with precision, which auxiliary part comprises soft-magnetic elements which are respectively and alternately situated on either side of the axis of symmetry of the detection device. The trailing end of one soft-magnetic element situated on one side of said axis substantially coincides with the leading end of a soft-magnetic element situated on the other side of said axis of symmetry. The direction of the active component of the magnetic excitation field of the Hall-effect crystal produced by a stationary magnetic exciter circuit is reversed because owing to the movement a soft-magnetic element which passes in the proximity of the Hall-effect crystal on one specific side takes the place of another soft-magnetic element which passes in the proximity of said Hall effect crystal on the other side.

This method, which is particularly suitable for the detection of specific angular positions of rapidly rotating parts because it permits the use of statically and dynamically balanced moving parts, may also be used for parts undergoing a linear movement.

The present Patent Application relates to a Hall-effect position detector employing the method set forth in the U.S. Pat. No. 4,086,533 and referred to above.

One of the objects of the present invention is to improve the detection accuracy, which is already very high, of position detectors which are based on the same principle and are described in the afore-mentioned U.S. patent.

Another object of the invention is to facilitate the manufacture of these detectors through a simpler construction.

In accordance with the invention a Hall-effect position detector comprising a stationary magnetic exciter circuit for the Hall-effect crystal cooperates with a movable part which moves in the immediate proximity of said detector and which comprises soft-magnetic elements which during their movement are respectively and alternately situated on either side of the axis of symmetry of the position detector, the trailing end of one soft-magnetic element situated on one side of said axis substantially coinciding with the leading end of a soft magnetic element situated on the other side of said axis of symmetry, is characterized in that the magnetic exciter circuit is constituted by a single permanent magnet of which one pole face, which is oriented towards the movable part, is provided with two symmetrical soft-magnetic pole pieces between which a narrow gap is formed in which the Hall-effect crystal is disposed.

Apart from its great simplicity, one of the surprising and unexpected features of the invention and this embodiment is that, by the use of two identical pole pieces which are fixed on the same pole face of a permanent magnet, despite all this a reversal of the transverse component of the magnetic field which influences the Hall-effect crystal can be obtained in that one soft-magnetic part which is situated in the immediate proximity of one of the pole pieces takes the place of another soft-magnetic part which is situated in the proximity of the other pole piece.

The use of a single magnet for the excitation of the Hall-effect crystal has technical advantages owing to a higher homogeneity of the sources of the magnetic flux than in the case of two different permanent magnets in conjunction with a pole piece each because two in principle identical permanent magnets taken from a given production lot and, even more so those from different production lots, may exhibit a spread in characteristics. The magnetic equilibrium of an exciter circuit formed by a single magnet (which equilibrium manifests itself in the low value of the transverse magnetic component and the absence of any disturbing soft magnetic elements) is substantially better than that of exciter circuits formed with the aid of two different magnets.

The mechanical construction of the position detector is also simplified and facilitated because there is only a single exciter magnet.

In a suitable embodiment of the position detector in accordance with the invention, the contact faces of the two symmetrical soft-magnetic pole pieces located on the pole face of the exciter magnet are spaced from each other by a distance which lies between the width of said contact faces and half said width. The narrow gap in which the Hall-effect crystal is disposed is formed between confronting pole faces of small surface area which are connected to the body of the corresponding pole piece by a portion which substantially has the shape of a truncated cone.

Such an embodiment ensures a certain "magnetic independence" for each of the pole pieces with respect to the other pole piece and a concentration of the transverse magnetic flux at the location of the narrow gap formed between the pole faces, and thus an increase of the transverse component of the magnetic field (for exciting the Hall-effect crystal), all other conditions being the same, which increases the sensitivity of position detection and the accuracy of this detection.

It is also advantageous to give the front part of the pole pieces a trapezoidal shape with truncated edges, in which the base of the substantially truncated part connecting the pole face to the body of the pole piece is inscribed. This arrangement reduces the magnetic leakage from said pole pieces towards the second pole of the permanent magnet.

Suitably, the sole exciter magnet is made of a hard-magnetic material having a low permeability, such as a ferrite obtained from a substance belonging to the group which includes barium and strontium. These ferrites have a good stability in the presence of a strong demagnetizing field and their low permeability renders it easier to obtain a certain magnetic independence of the two pole pieces constituting the front part of the Hall-effect position detector in accordance with the invention.

In an advantageous arrangement the second pole face of the sole exciter magnet is provided with a single flat soft-magnetic pole piece having a thickness which is small with respect to the height of the magnet in its direction of magnetization, which flat pole piece is provided with a small adjustable magnetic shunt at two of its ends. The shunt extends in the direction of the front pole piece in an adjustable manner, which front pole piece is disposed on the first pole face of the magnet straight above the relevant end of said single flat pole piece.

Such a flat pole piece reduces the overall reluctance of the magnetic exciter circuit and thus reduces the magnitude of the demagnetizing field applied to the permanent exciter magnet. By means of the small adjustable magnetic shunts it is possible to compensate for minor imperfections of the assembly, which may occur during the manufacture of transducers in accordance with the invention, such as slight symmetry errors during the mechanical assembly of the parts constituting the magnetic circuit, a small error in the "magnetic" homogeneity of the exciter magnet, or a very small deviation (sometimes referred to as "offset") of the Hall voltage supplied by the Hall-effect semiconductor crystal. By a suitable adjustment of the position of one of the small magnetic shunts, these minor faults can readily be corrected and the position detector in accordance with the invention can be balanced magnetically and electrically, which may lead to an absolute elimination of the transverse component of the magnetic field in the narrow gap in which the Hall-effect crystal is disposed or in a very small transverse component of suitable magnitude and direction.

Suitably, the permanent exciter magnet has a central groove at two of its ends, which groove is adapted to cooperate with the small adjustable magnetic shunt which is disposed at the end of the single flat pole piece corresponding to the relevant end of the exciter magnet. Such an arrangement improves the efficiency of the magnetic shunts and at the same time enables the overall size of the detection device to be reduced through a reduction of the diameter of the described circle of the device.

Experiments conducted have revealed that in respect of the soft-magnetic elements which are mounted on the moving part in front of which the position detector in accordance with the invention is disposed, it is advantageous to introduce a small overlap between the trailing end of a soft-magnetic element situated on one side of the axis of symmetry of the detector and the leading end of a soft-magnetic element which is situated on the other side of said axis of symmetry. The rate of variation of the magnetic induction in the gap in which the Hall-effect crystal is disposed, as a function of the displacement of said soft-magnetic elements, is then greater than in the case of exact coincidence between the trailing end of one soft-magnetic element and the leading end of the following soft-magnetic element.

When the movable part is a rotating part, a small angular overlap is therefore introduced between the trailing end of one soft-magnetic element and the leading end of the next element. The rotating part is then at least partly made of a soft-magnetic material of good permeability. The outermost portions of the rotating part are constituted by soft-magnetic elements which alternately pass the position detector, one in front of one of the pole pieces and the other in front of the other pole piece, producing successive magnetic inductions of opposite sense in the air gap between said pole pieces.

The specific angular positions of the rotating part, which are detected with high precision, are those where one soft-magnetic element takes the place of another soft-magnetic element, which is accomplished by a very rapid change of the direction of magnetic induction in said air gap.

The following description with reference to the accompanying drawings, which are given by way of non-limitative example, will clarify the invention and how it can be realized.

Figure 1:
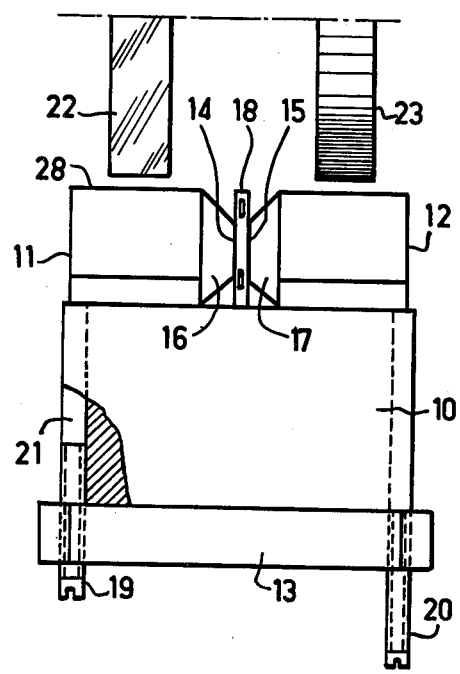
FIG. 1 is an elevation of an example of a position detector in accordance with the invention, with a very limited sectional view which comprises a partial crossection taken on the line I—I of FIG. 2, which elevation also shows the position of the soft-magnetic elements which move in the immediate proximity of the position detector shown.

The magnetic circuit of the position detector shown in FIG. 1 comprises 4 main parts which are: a permanent magnet 10, whose shape is that of a rectangular parallelepiped with four rounded edges, and two lateral grooves, two symmetrical pole pieces 11 and 12 fixed to the frontmost pole face of the magnet 10, and a flat pole piece 13 fixed to the rearmost pole face of said magnet.

Suitably, the various pole pieces are fixed to the permanent magnet 10 by glueing. This glueing may be effected by means of glues which only demand a fairly short fixation of the parts in a suitable jig (for example between 15 seconds and 10 minutes), which may be glues on an expoxy-resin basis or a cyanoacrylic-ester basis, such as ethyl or methyl cyanoacrylates.

Products belonging to the first group are the adhesives which are commercially available under the designations 601 (Blocpresse Super Rapide) and 602 from the Loctite Corporation and products belonging to the second group are the adhesives which are commercially available under the designations IS 407, IS 414 and IS 496, also from the Loctite Corporation.

Near the axis of symmetry of the position detector the pole pieces 11 and 12 are respectively terminated by a pole face 14 and a pole face 15. The pole face 14 is connected to the body of the pole piece 11 by a portion 16 which roughly has the shape of a truncated cone. The pole face 15 is connected to the body of the pole piece 12 in a similar way by a portion 17 which also roughly has the shape of a truncated cone.

An integrated circuit 18, comprising a Hall-effect crystal located in the central part of the gap between the pole faces 14 and 15, is disposed in said gap. The integrated circuit 18 comprises amplifier stages and an output stage having two stable states such that, passage from one of said states to the other is cumulative and thus is very rapid.

The rearmost flat pole piece 13 is provided with two small screws 19 and 20 of soft or semihard steel, which constitute two adjustable magnetic shunts, which by tightening can be made to penetrate one of the grooves formed in the central part of the two side faces of the permanent magnet 10. In FIG. 1 and in FIG. 2 it can be seen that the screw 19 partly engages with one of the said grooves, bearing the reference numeral 21, whereas the upper end of the screw 20 is disposed at the location of the lower pole face (rear pole face) of the permanent magnet 10.

Figure 2:
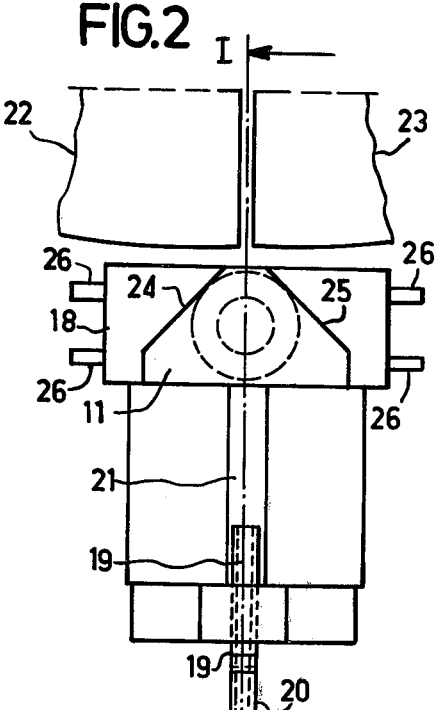
FIG. 2 is a side view of the position detector of FIG. 1 viewed from the left.

FIGS. 1 and 2 also partly show the soft-magnetic elements 22 and 23 which are mechanically connected to the moving part whose passage through specific well-defined positions is to be detected with precision, but without mechanical or electrical contact. In the present example, the moving part is a rotating part and the edges of the soft magnetic elements 22 and 23 are circular and have the same radius.

For the detection of the passage through specific positions of parts which perform a linear movement, the edges of said parts are straight and parallel to the direction of movement.

The soft-magnetic elements 22 and 23 are shown in the position which, during the change of the transverse direction of the magnetic field in the gap between the pole faces 14 and 15, corresponds to the instant at which the transverse magnetic field is zero.

The front part of the pole pieces 11 and 12 has a trapezoidal shape, visible in FIG. 2, which trapezoidal shape is the result of the presence of two oblique faces 24 and 25 on the upper part of said pole pieces. The insulating housing of the integrated circuit 18, which housing is moulded from a plastics material, projects laterally from both sides of the pole pieces 11 and 12. The input and output wires can be soldered to the various connecting tags 26 of the circuit 18.

Figure 3:
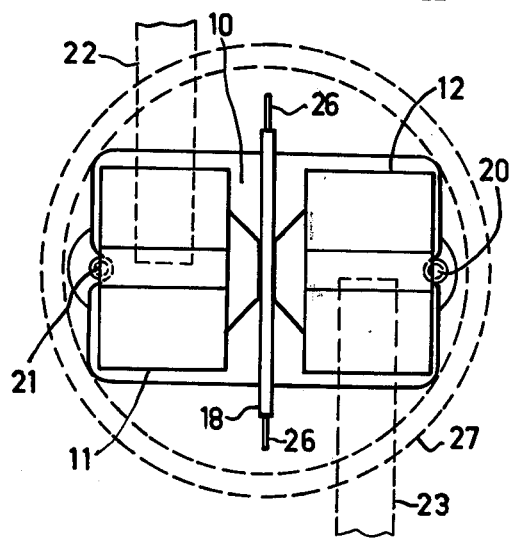
FIG. 3 is a plan view of the position detector of FIG. 1 in which the soft-magnetic elements are assumed to be transparent and their paths are represented by dashed lines.

FIG. 3 shows a position detector in accordance with the invention disposed in the interior of a tube 27, shown dashed, which is made of a non-magnetic metal such as aluminium. The manner in which such a detector can be accommodated in the tube 27 is clearly visible.

The top edge of the tube 27 is at the same level as the top surface 28 of the pole pieces. The connecting wires of the integrated circuit 28 are soldered to it before the detector is mounted in the tube 27, and subsequently the tube is filled with a tinted epoxy resin mixed with aluminium powder.

Thus, a detection device is obtained which is not fragile and which can easily be mounted and adjusted to the operating position.

Figure 4:
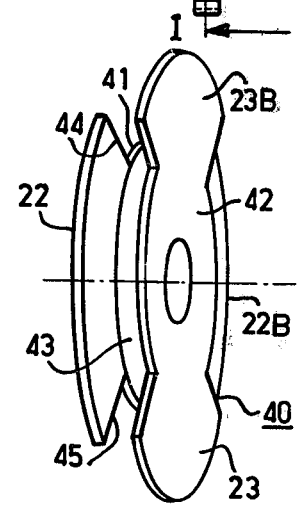
FIG. 4 is an isometric projection of an example of a rotating part which is at least partly made of a soft-magnetic material of good permeability and which is adapted to cooperate with a position detector in accordance with the invention; this projection is at a slightly smaller scale, which is much smaller than the scale used in FIGS. 1, 2 and 3.

FIG. 4, in which for simplicity of drawing the angular position of the projecting soft-magnetic elements does not correspond to the position of the soft-magnetic elements visible in FIGS. 1 and 2, shows a rotating part 40. In the example of FIG. 4, the part 40 is obtained by the assembly of two identical elementary parts 41 and 42 on a cylindrical spacer 43.

The part 41 comprises two symmetrical projecting elements 22 and 22B whose circular edges cover an angle which is slightly smaller than 100 degrees, for example 99.5 degrees at an outer diameter of approximately 120 mm, and which are connected to the central circular portion of the part 41 by radial edges such as 44 and 45.

The part 42, which is identical to the part 41, comprises symmetrical projecting elements 23 and 23B whose axes make an angle of 100 degrees with the axes of the projecting elements 22 and 22B of the part 41 so that, in the present example, every two radial edges of the projecting elements 22, 23, 22B and 23B have an angular spacing of a half degree from each other.

The parts 41 and 42 are for example manufactured from soft or extra-soft sheet steel of a suitable thickness and are obtained directly by stamping with the aid of a suitable stamping tool. The spacer 43 may be magnetic (for example made from soft or extra soft steel) or non-magnetic (for example made from aluminium or duraluminium). Depending on the type of material of the spacer 43, the parts can be assembled by, for example, electrical spot welding or by riveting.

The part 40 shown in FIG. 4 serves to obtain four inversions of the direction of the transverse magnetic field in the gap in which the Hall-effect crystal (of the integrated circuit 18) is disposed per revolution of the spindle on which said part is mounted. This for example may correspond to the accurate detection of the "top dead centre at end of the compression stroke" of the four pistons of a four-stroke four-cylinder engine for the case where the part 40 rotates along with the camshaft of such an engine at half the speed of the crankshaft.

Depending on their conditions of use, the parts having a function similar to that of the parts 40 may have a structure and number of projecting elements other than in the present example. For the same application and for a part which is mounted directly on the crankshaft of the relevant engine, the parts corresponding to the parts 41 and 42 would be provided with a single projecting element covering an angle of the order of 199.5 degrees to approximately 99.5 degrees.

Obviously, it is easy to adapt the structure of a part having a function similar to that of the part 40 shown in FIG. 4 so as to obtain the desired information as a function of specific angular positions to be detected and with the necessary precision.

Figure 5:
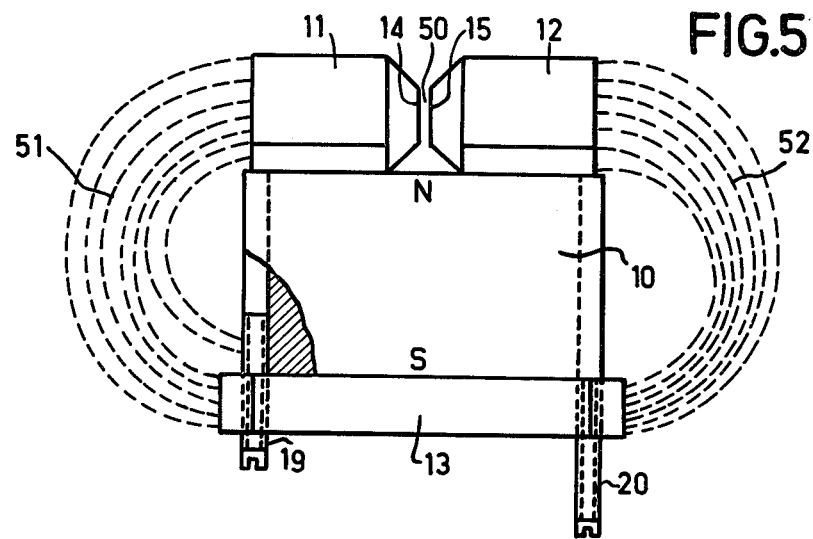
FIG. 5 is an elevation of the magnetic exciter circuit of the position detector of FIG. 1, in which the leakage flux and the effect of the magnetic shunts in the absence of the frontmost soft-magnetic disturbing element, are schematically represented.
Figure 6:
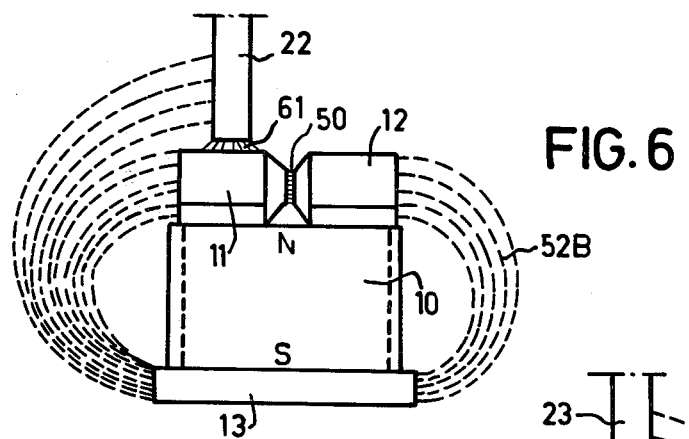
FIG. 6 is a schematic elevation of the magnetic exciter circuit of FIG. 5, which schematically represents the change of the lines of force of the magnetic fields as a result of a soft-magnetic element near the left-hand pole piece.
Figure 7:
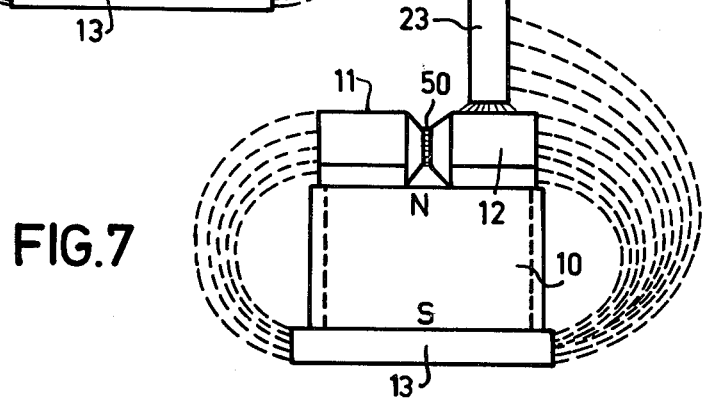
FIG. 7 is a similar view to that of FIG. 6, but with a soft-magnetic element near the right-hand pole piece of the magnetic exciter circuit.

For FIGS. 5, 6 and 7 it has been assumed that the frontmost pole pieces of the permanent magnet 10 is a north pole. It is evident that the following description is equally valid if the frontmost pole piece is a south pole, but that only the conventional orientations of the magnetic field in the air gap, which by definition extends from the north pole to the south pole, are to be reversed.

The magnetic exciter circuit shown in FIG. 5 is at rest and there is no soft-magnetic disturbing element in the proximity of the pole piece 11 or the pole piece 12. The gap formed between the pole face 14 and the pole face 15 (in which gap the integrated circuit 18 which comprises a Hall-effect crystal is disposed in the assembled condition of the position detector) is designated by the reference numeral 50.

The leakage fluxes between the pole piece 11 and the lower pole piece 13 on the one hand, and between the pole piece 12 and the lower pole piece 13 on the other hand, are schematically represented by two bundles 51 and 52 of lines of force of the magnetic field existing between the said respective pole pieces on the outside of the magnetic exciter circuit.

In a magnetic exciter circuit whose symmetry is ideal, both in a mechanical and magnetic respect, the transverse magnetic field in the gap 50 (horizontal in the Figure) is null and components which may exist in the vertical plane of symmetry are null or negligible (moreover, they have no influence on the behaviour of the Hall-effect crystal because they are disposed in its plane).

In a real magnetic exciter circuit, there is generally a small transverse component of the magnetic field in the gap 50 in the rest condition for FIG. 5 it has been assumed that there is a transverse component which goes from the left to the right, the pole piece 11 tending to emit a magnetic flux which is slightly greater than that emitted by the pole piece 12 (for example, because it receives a magnetic flux from the left part of the magnet 10 which is slightly greater than that received by the pole piece 12 from the right-hand part of said magnet).

In order to cancel this transverse component, it suffices to slightly reduce the reluctance presented to the magnetic flux emitted by the pole piece 11 by adjusting the magnetic shunt 19 and bringing it into the position shown in the Figure. Furthermore, the screw 19 slightly shunts the left part of the magnet 10, and these two actions are complementary.

When the transverse component of the magnetic field is oriented from the right to the left, the frontmost pole face of the magnet 10 being a north pole, it suffices to slacken the screw 19 (or to leave it slackened) and to tighten the screw 20 in order to eliminate said component.

After this adjustment, the two shunt screws 19 and 20 are preferably locked by a drop of paint, unless this is immediately followed by encapsulation in for example an epoxy resin.

In FIG. 6 the soft-magnetic element 22 is shown in an angular position which differs from that in FIGS. 1, 2 and 3 and it faces, and is very near to, the pole piece 11, while the soft magnetic element 23 is remote from the pole piece 12.

Under these conditions and because of the low reluctance of the frontmost gap 61 which exists between the pole piece 11 and the soft-magnetic movable element 22, the overall reluctance between the pole piece 13 and the assembly (11+22) is substantially reduced in comparison with the reluctance between the pole pieces 11 and 13 in the rest condition. The mechanism which on a small scale enables a small transverse component of the magnetic field in the gap 50 in the rest condition to be eliminated by means of the magnetic shunts 19 and 20, now intervenes on a large scale, and to illustrate this, it may be said that via the gap 50 the assembly (pole piece 11+magnetic element 22) drains a fraction of the magnetic flux supplied to the pole piece 12 by the magnetic 10 and emitted by said pole piece, which causes a considerable magnetic field to appear in said air gap, which in the case of FIG. 6 is oriented from the right to the left.

Consequently, the magnetic flux going directly from the pole piece 12 to the right-hand part of the lower pole piece 13, which is represented by the bundle of lines of force of the magnetic field 52B, is reduced accordingly, while the magnetic flux supplied to the pole piece 12 by the right-hand part of the permanent magnet 10 may then be considered substantially constant to a first approximation, in particular when the magnetic 10 is made of a barium or strontium ferrite.

FIG. 7 shows how the bundle of lines of force of the magnetic field changes when the soft-magnetic element 22 is moved away from the pole piece 11 and when the soft-magnetic element 23 is opposite the pole piece 12. A mechanism similar to that explained with reference to FIG. 6 then intervenes. With the aid of the soft-magnetic element 23, the pole piece 12 drains a part of the magnetic flux supplied to the pole piece 11 by the left-hand part of the magnet 10, which results in a transverse component of the magnetic field, which is oriented from the left to the right, i.e. reversed with respect to that of FIG. 6, in the gap 50.

On the basis of the above explanation, it is evident that if a soft-magnetic element situated opposite one of the frontmost pole pieces takes the place of another soft-magnetic element situated opposite the other front pole piece, a variation of the transverse component of the magnetic field takes place in in the gap 50 which varies from a value +H to a value −H, or inversely, from a value −H to a value +H, at the instant of the transition.

Near the position corresponding to the zero passage of the transverse component of the magnetic field, the curve representing the variation of said transverse component as a function of the displacement of the soft-magnetic element is substantially straight and the slope of said curve is greater when a small spacing (or offset) is provided between the trailing end of one soft-magnetic element and the leading end of the next element which is situated on the other side of the axis of symmetry of the position detector.

By way of example, the properties and possibilities of an example of an embodiment of a position detector in accordance with the invention may be specified as follows, using as a Hall-effect device an integrated circuit whose Hall-effect crystal supplies a nominal voltage of 0.5 mV for a magnetic field of $1.10^3$ Amps. per meter, as is the case with the integrated circuit which is available from N. V. Philips under the designation TC 450 A and which comprises a Hall-effect element in combination with a differential preamplifier incorporating six NPN transistors.

Depending on the direction of the Hall voltage and consequently on the orientation of the horizontal component of the magnetic field in the gap 50, the output transistor of the final amplifier of the integrated circuit is either cut off or saturated by from a Hall voltage having a value of approximately 0.4 mV, which behaviour is obtained by the use of a threshold and trigger-effect circuit which is related to "Schmitt trigger" circuit. This ensures rapid and precise switching even if the variation of the transverse component of the magnetic field is slow.

In this example, the magnet used is made of an anisotropic ferrite composed of iron and strontium, commercially available from N. V. Philips under the designation "FERROXDURE 330", the dimensions of the magnets being: length 12 mm, width 8 mm, height 7 mm.

The soft-magnetic movable elements cooperating with the detector have a thickness of 2 mm and their inner surfaces are situated in planes which are spaced 5 mm from each other. The distance between the outer edge of the soft-magnetic elements and the front face of the pole pieces is suitably 0.5 mm, the tangential overlap between the trailing end of one soft-magnetic element and the leading end of the next soft-magnetic element which is situated on the other side of the axis is 0.5 mm.

Under these conditions a transverse component of the magnetic field has been measured in the gap 50 of 36,000 Amps. per meter and the slope of the curve representing the variation of the strength of said transverse component as a function of the tangential displacement of the soft-magnetic elements when they occupy the position shown in FIG. 2 is 20,000 A/m per millimeter displacement.

The accuracy of the detection of the passage of the soft-magnetic elements in the position shown in FIG. 2 is found to be higher than 0.1 mm in a temperature range from $-25°$ to $+125°$ C.

What is claimed is:

1. A Hall-effect position detector comprising a Hall-effect crystal, a stationary magnetic exciter circuit for the Hall-effect crystal which exciter circuit has an axis of symmetry, the exciter circuit being arranged to cooperate with a movable part movable in the immediate proximity of said detector and which comprises soft-magnetic elements which during their movement are respectively and alternately situated on either side of the axis of symmetry with a trailing end of one soft-magnetic element situated on one side of said axis substantially coinciding with a leading end of a soft-magnetic element situated on the other wise of the said axis of symmetry, the magnetic exciter circuit comprising a single permanent magnet having one pole face oriented towards the movable part and provided with two symmetrical soft-magnetic pole pieces on said pole face arranged to cooperate with said movable part and between which a narrow gap is formed in which the Hall-effect crystal is disposed on said axis of symmetry.

2. A position detector as claimed in claim 1 wherein confronting pole faces are formed on the two symmetrical soft-magnetic pole pieces located on the pole face of the exciter magnet, said pole faces being spaced from each other by a distance which lies between the width of said pole faces and half said width, and wherein the narrow gap in which the Hall-effect crystal is disposed is formed between confronting pole faces of small surface area connected to the body of the corresponding pole piece by a portion which substantially has the shape of a truncated cone.

3. A position detector as claimed in claim 2, wherein the front part of the symmetrical soft-magnetic pole pieces has a trapezoidal shape with truncated edges, in which a base of the substantially truncated part connecting the pole face to the body of the pole piece is inscribed.

4. A position detector as claimed in claim 1 wherein the single exciter magnet is made of a hard-magnetic material such as a ferrite obtained from a substance belonging to the group which includes barium and strontium.

5. A position detector as claimed in claim 1 wherein the single permanent magnet comprises a second pole face provided with a single flat soft-magnetic pole piece having a thickness which is small relative to the height of the permanent magnet in its direction of magnetization, said flat pole piece being provided with a small adjustable magnetic shunt at two of its ends adjustable in the direction of the frontmost pole piece disposed on the first pole face of the magnet straight above the relevant end of said single flat pole piece.

6. A position detector as claimed in claim 5 wherein the permanent exciter magnet has two ends adjacent the respective two ends of the single flat pole piece and a central groove in each said end adapted to cooperate with the small adjustable magnetic shunt which is disposed at the end of the single flat pole piece corresponding to the relevant end of the exciter magnet.

7. A position detector as claimed in claim 1 wherein a small overlap exists between the trailing end of one soft-magnetic element situated on one side of the axis of symmetry and the leading end of a soft-magnetic element situated on the other side of said axis of symmetry.

8. A position detector for determining the position of a moving part comprising, a Hall-effect crystal, a stationary magnetic circuit for exciting the Hall-effect crystal including a single permanent magnet having a first pole face provided with two symmetrical confronting soft-magnetic pole pieces forming a narrow gap along an axis of symmetry of the magnetic circuit in which gap the Hall-effect crystal is disposed so as to be subject to a magnetic excitation field produced therein by the permanent magnet, said moving part comprising first and second soft-magnetic elements movable in close proximity to said two pole pieces and respectively located on opposite sides of said axis of symmetry with each soft-magnetic element having a leading end and a trailing end and arranged so that a trailing end of one element coincides with a leading end of the other element.

9. A position detector as claimed in claim 8 wherein said two confronting pole pieces are symmetrically disposed on opposite sides of said axis of symmetry with the confronting end of each pole piece formed as a truncated cone.

10. A position detector as claimed in claim 8 wherein the magnetic axes of the two confronting pole pieces are aligned and are perpendicular to the magnetization direction of the permanent magnet.

* * * * *